No. 809,215. PATENTED JAN. 2, 1906.
H. E. PARSON.
LOCOMOTIVE ASH PIT AND BLOWER.
APPLICATION FILED JAN. 14, 1904.
2 SHEETS—SHEET 1.
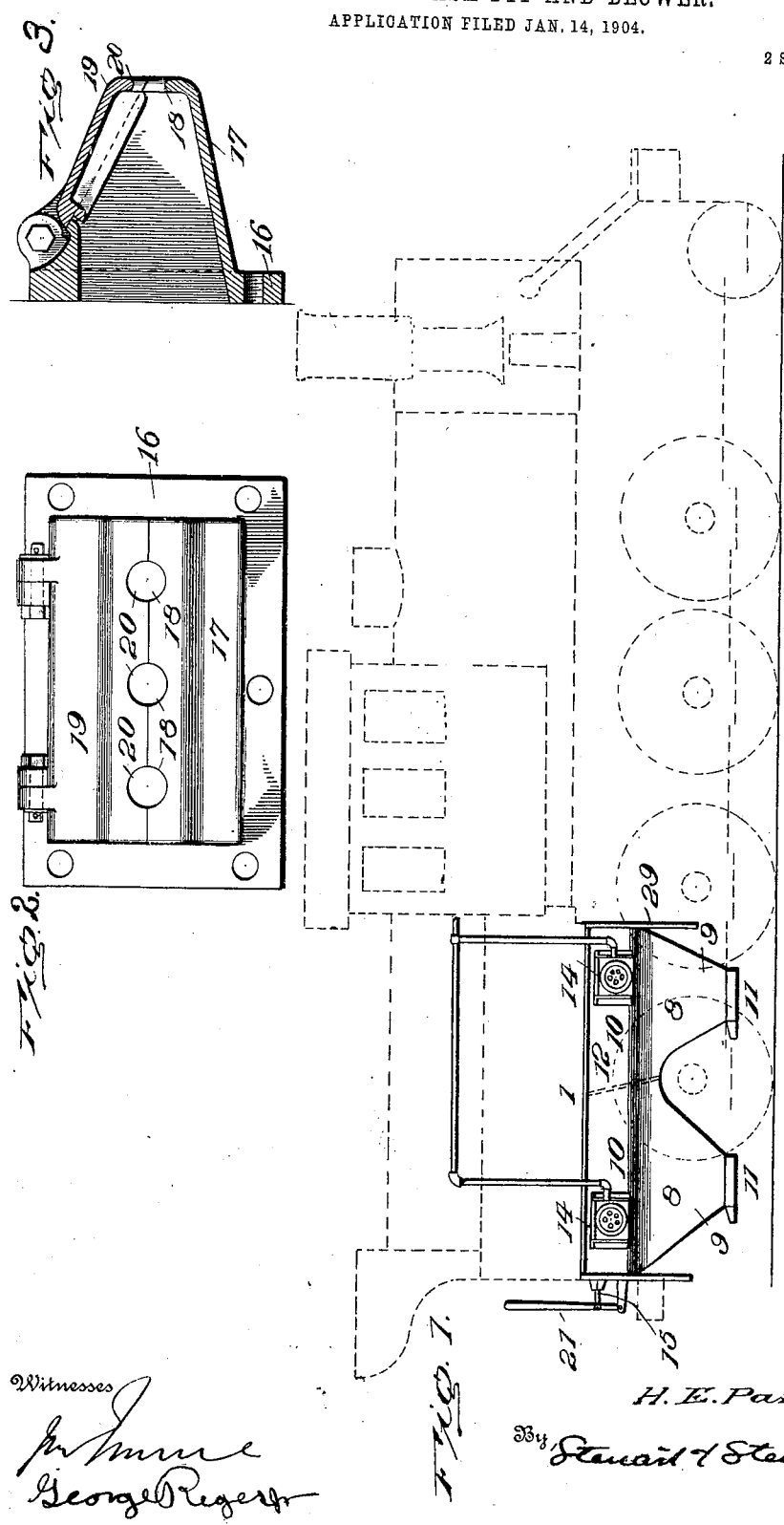

No. 809,215. PATENTED JAN. 2, 1906.
H. E. PARSON.
LOCOMOTIVE ASH PIT AND BLOWER.
APPLICATION FILED JAN. 14, 1904.
2 SHEETS—SHEET 2.
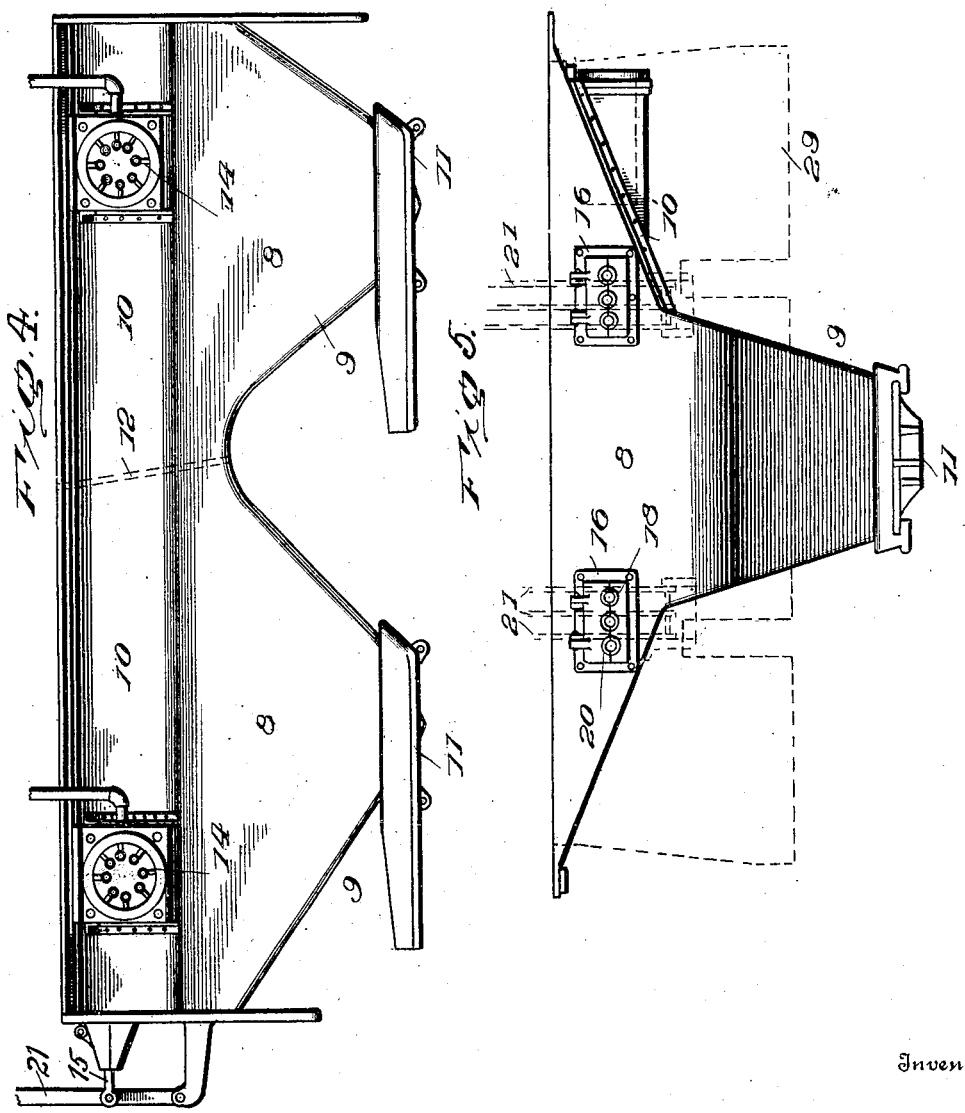

UNITED STATES PATENT OFFICE.

HENRY EDWIN PARSON, OF NEW YORK, N. Y.

LOCOMOTIVE ASH-PIT AND BLOWER.

No. 809,215.  Specification of Letters Patent.  Patented Jan. 2, 1906

Application filed January 14, 1904. Serial No. 189,009.

*To all whom it may concern:*

Be it known that I, HENRY EDWIN PARSON, a citizen of the United States of America, and a resident of 320 Broadway, New York city, New York, have invented certain new and useful Improvements in Locomotive Ash-Pits and Blowers, of which the following is a specification.

The invention relates to an improvement in locomotive construction.

The object of the invention is the production of means to prevent unnecessary leakage of air around the bars for operating the grate-section and also in means for protecting blowers from the action of the wind.

With these objects in view the invention will be described in detail in connection with the accompanying drawings, in which—

Figure 1 is a view in elevation, illustrating the application of my invention, a locomotive being shown in dotted lines. Fig. 2 is an enlarged elevation of the device through which the grate-operating levers pass. Fig. 3 is a transverse sectional view of the same. Fig. 4 is an enlarged view showing the ash-pits in side elevation. Fig. 5 is an end view of the same.

Referring to the drawings, the locomotive illustrated is of usual construction with the exception of the details noted and needs no particular description herein.

Beneath the grate 1 are arranged the ash-pits 8, each having a central depending portion 9 arranged within the plane of the locomotive-wheels and outwardly-flaring sides 10, equal to the width of the grate. A door or movable section 11 closes a dump-opening in the bottom of the ash-pit and is arranged to be practically hermetically sealed when closed. The ash-pits are entirely separate, being divided by a vertical partition 12, rising centrally between the pits to the grate, as shown. Each ash-pit is formed with an opening 13 in the side, to which is secured a blower 14 of usual or preferred construction whereby to create a forced draft for the fire. This construction provides an ash-pit or a plurality of same entirely separate and closed air-tight in contradistinction to the usual open ash-pan of the locomotive, and locating a separate blower in each of these entirely-closed compartments permits the operator to influence the fire in one part of the grate to a greater degree than in another through suitable operations of the blowers.

15 represents levers which are connected in any suitable way to the grate 1 for the purpose of shaking the grate. These levers extend toward the rear of the locomotive and pass through openings in the rear wall of the ash-pit, the openings being provided with means to prevent unnecessary leakage during the operation of the levers.

The means which is shown for preventing the unnecessary leakage of air is shown in detail in Figs. 2 and 3. Referring specifically to these figures, 16 is a plate secured to the ash-pit around the openings through which the grate-levers project. The plate 16 is provided with the rearwardly-projecting upwardly-inclined member 17, which has in its upper edge suitable notches 18, forming rests for the levers. 19 is a door pivoted to the plate 16 and provided on its front edge with the notches 20, which register with the notches 18 of the member 17. The edges of the members 17 and 19 come together, and the notches 18 and 20 form openings through which the grate-levers project. By this construction the levers are free to be operated, and during the operation of the levers there is no large opening made in the ash-pit to allow leakage of air therefrom.

In operating the levers to shake a particular section of the grate the movable member 19 will rise and fall with the forward and rearward rise and fall of the levers, maintaining, however, a closed contact with the levers to prevent the leakage of unnecessary air and automatically falling into closed position when the lever is released.

If desired, each of the levers 15 may be connected to the usual vertical handle 21, pivoted at its lower end to facilitate movement of the levers.

In order to prevent the speed of the locomotive from setting up an induced current through the air-inlets of the blowers, I provide wind-shields 29, secured to the forward and to the rear ends of the ash-pits. These shields extend slightly beyond the ends of the blowers and afford a comparatively dead space in such locality, whereby an effective operation of the blowers is permitted, or I can place such shields directly behind each blower, and thus increase the supply of air to the same, due to the forward movement of the engine.

What I claim as new, and desire to secure by Letters Patent, is—

1. In a locomotive, an ash-pit, a grate, levers for operating the grate, the ash-pit being provided with an opening through which the levers pass, a device for closing said opening comprising a fixed member to form a normal support for the levers and a hinged member resting on the levers and movable in unison therewith, whereby to prevent the escape of air in the operation of the levers.

2. In a locomotive, an ash-pit, a grate, levers for operating the grate, the ash-pit being provided with an opening through which the levers pass, a device for closing said opening comprising a fixed member provided with an extension, said extension forming a normal support for the levers and a hinged member provided with a corresponding extension and resting on the levers and moving in unison therewith, whereby the escape of air in the operation of the levers is prevented.

3. In a locomotive, an ash-pit, a grate, levers for operating the grate, the ash-pit being provided with an opening through which the levers pass, a device for closing said opening comprising a fixed member provided with an extension, said extension forming a normal support for the levers and a hinged member provided with a corresponding extension and resting on the levers and moving in unison therewith, said members being provided with registering notches through which the levers pass.

4. In a locomotive, a grate, an ash-pit arranged beneath the grate and closed air-tight except toward the grate, a blower in the ash-pit and a wind-shield for the blower supported by the ash-pit independent of the blower.

5. In a locomotive, a grate, an ash-pit arranged beneath the grate and closed air-tight except toward the grate, a blower in the ash-pit and a pair of wind-shields, one arranged in front of and the other in the rear of the blower, said wind-shields being carried by the ash-pit independent of the blower whereby a dead-air space is formed around the blower.

6. In a locomotive, a grate, a plurality of ash-pits arranged beneath the grate, each of said ash-pits being entirely independent and closed air-tight except toward the grate, a blower in each ash-pit and a wind-shield carried by the forward ash-pit, said wind-shield being entirely independent of the blower and adapted to shield the blower of each ash-pit.

7. In a locomotive, a grate, a plurality of ash-pits arranged beneath the grate, each of said ash-pits being entirely independent and closed air-tight except toward the grate, a blower in each ash-pit and a pair of wind-shields one arranged in front of the blowers and the other arranged behind the blowers, said shields being carried by the ash-pits entirely independent of the blowers and forming a dead-air space in which the blowers are located.

8. In a locomotive, a grate, an ash-pit arranged beneath the grate, closed air-tight except toward the grate, a blower in the ash-pit, a plate carried by the ash-pit and extending out at right angles to the side of the ash-pit to form a wind-shield for the blower.

9. In a locomotive, a grate, an ash-pit arranged beneath the grate, said ash-pit closed air-tight except toward the grate, a blower in the ash-pit and a pair of plates extending out at right angles to the sides of the ash-pit, one in front of the blower and the other in the rear thereof, said plates being independent of the blower and forming a dead-air space around the blower.

10. In a locomotive, a grate, an ash-pit, a blower in the ash-pit and a wind-shield separated from the blower and adapted to form a dead-air space around the blower.

Signed by me at New York this 12th day of December, 1903.

HENRY EDWIN PARSON.

Witnesses:
E. R. BERKELEY,
L. H. LATHAM.